Nov. 27, 1934.  A. NAULT  1,982,141
UNIVERSAL PULLEY
Filed June 28, 1934   2 Sheets-Sheet 1
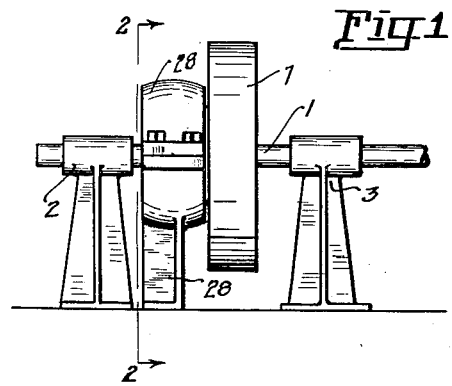
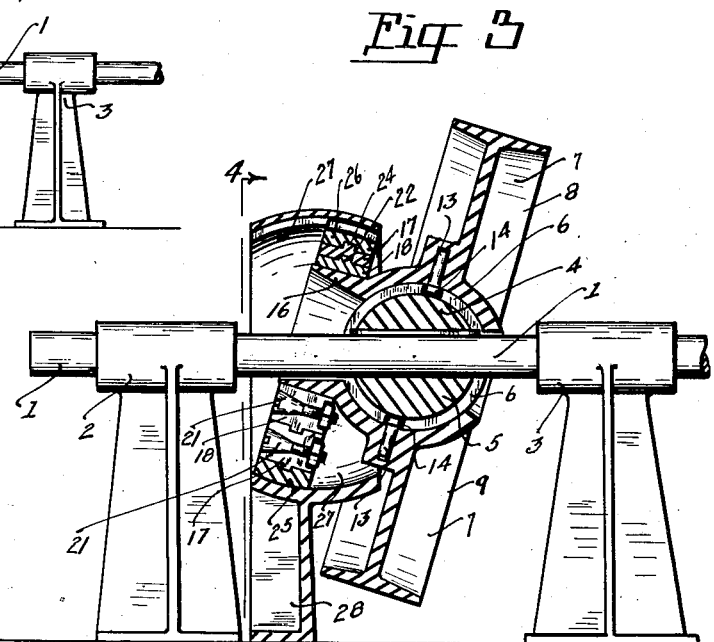
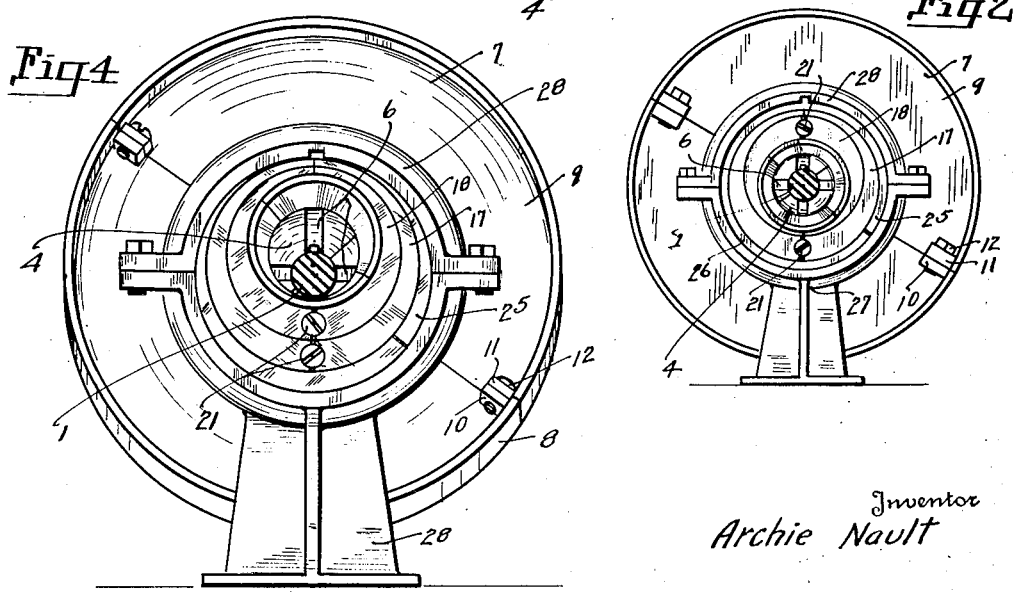
Inventor
Archie Nault
By Thomas Bilyeu
Attorney Nov. 27, 1934. A. NAULT 1,982,141
UNIVERSAL PULLEY
Filed June 28, 1934   2 Sheets-Sheet 2

Archie Nault
INVENTOR
BY Thomas Bilyeu
ATTORNEY

Patented Nov. 27, 1934

1,982,141

UNITED STATES PATENT OFFICE 1,982,141

UNIVERSAL PULLEY

Archie Nault, Beaverton, Oreg.

Application June 28, 1934, Serial No. 732,779

4 Claims. (Cl. 64—98)

The invention is used in conjunction with a power rotated shaft. I spline a spherical split member upon the shaft and adjustably mount a pulley upon the split sphere and effect a driving relationship between the split sphere and the pulley. A hub outwardly extends from one side of the pulley and a pair of adjustable split eccentrics are mounted relative to each other and upon the hub to thereby tilt the face of the pulley at an angle to the longitudinal center line of the shaft. A split ring acts as a bearing for the eccentric, means being provided to expand the split eccentric and the split ring and to fixedly position the same within an eccentric that is disposed about this split ring and the eccentric members.

My invention is to be used where it is desired to effect a drive or to drive a shaft at an angle to that of the longitudinal center line of the shaft.

A further object of my invention consists in so mounting a pulley upon a shaft that an angle drive may be effected by the pulley relative to that of the shaft.

A still further object of my invention consists in so constructing the related parts that the device may be adjustably mounted upon a shaft without the taking down of the shaft to place the same thereupon and to make an angle drive by the pulley.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 1 is a front view of the angle drive pulley and the related parts shown mounted upon a shaft that is supported within suitable bearings.

Fig. 2 is a sectional end view of the mechanism illustrated in Fig. 1. This view is taken on line 2—2 of Fig. 1, looking in the direction indicated.

Fig. 3 is a sectional front view of the pulley assembly.

Fig. 4 is an end view of the mechanism illustrated in Fig. 3. This view is taken on line 4—4 of Fig. 3, looking in the direction indicated.

Like reference characters refer to like parts throughout the several views.

Figure 5:
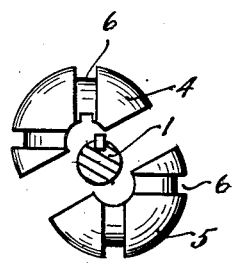
Fig. 5 is an end view of the shaft and an end view of the spherical member shown spaced apart and in position for being placed upon the shaft.
Figure 6:
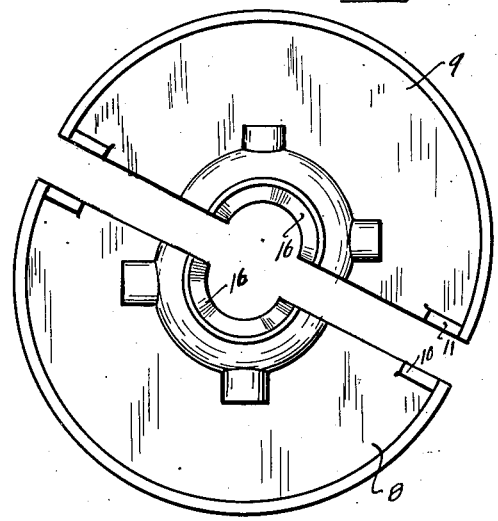
Fig. 6 is a side view of the split pulley illustrating the two half members spaced apart.
Figure 7:
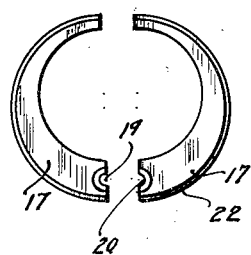
Fig. 7 is a plan view of one pair of the split eccentrics.
Figure 9:
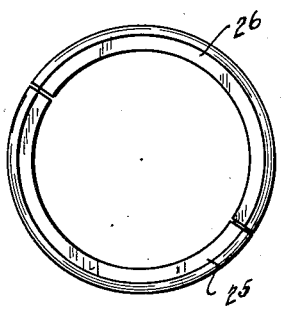
Fig. 9 is a plan view of the split ring.
Figure 8:
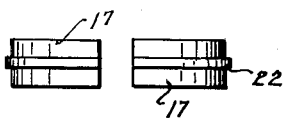
Fig. 8 is a side view of the pair of split eccentrics illustrated in Fig. 7.
Figure 10:
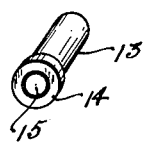
Fig. 10 is a perspective end view of the driving pin and roller that effects the driving connection between the pulley and the spherical members.

My invention is used upon a shaft 1. I have here shown the shaft as being journaled within suitable bearings 2 and 3. The shaft may be a stub shaft or it may be a line shaft.

I spline a split spherical member comprised of two parts, as shown at 4 and 5 upon the shaft at the position that the pulley is to occupy upon the shaft. I form a plurality of grooves 6 in the outer surface of the split spherical member. A pulley 7 is positioned upon the split spherical members. The pulley is also a split pulley and is comprised of two like half-section members 8 and 9. The same are secured together by any suitable fastening means as by forming a pair of fastening lugs 10 and 11 upon the adjacent meeting edges of the pulley sections and the same are secured together by fastening bolts 12. A plurality of pins 13 are disposed within the pulley and a roller 14 is journaled upon the free end 15 of the pin. The rollers 14 are made to precisely fit the grooves 6 in the half-spherical members that are splined upon the shaft 1. A hub 16 outwardly extends from one side of the pulley. The longitudinal center line of the hub should be made to meet the axial center line of the pulley.

I provide a pair of split eccentrics 17 and 18. The inner one of the pair engages the outer surface of the pulley hub. I provide bolt holes 19 and 20 in the abutting adjacent ends of the split eccentrics. The side walls of the hole are tapered, and tapered bolts 21 are fitted into the tapered holes. An outwardly extending ledge 22 is disposed central of the inner one of the eccentrics and a receiving groove 23 is disposed within the inner surface of the outer pair of split eccentrics 17, into which the ledge 22 is fitted. The outer one of the pair of the eccentrics 17 also has a ledge 24 disposed central of its outer peripheral surface and a split ring comprises sections 25 and 26 is secured to and a working relationship is formed between the split ring sections and the outer one of the pair of split eccentrics 17. A ledge 24 fits into an annular groove disposed upon the inner surface of the split ring members. A husk 27 is formed within the stand 28 and the inner surface of the husk is so fashioned as to permit a rotation of the split ring therein and an adjustment of the same relative to the inner surface of the husk.

When the annular groove and the pulley 7 have been positioned to meet the requirement of the drive by the adjusting of the eccentrics, the tapered bolts are then tightened sufficiently to expand the eccentrics and the split ring relative to the husk and locks the same therein, thus providing a readily adjustable assembly means that may be positioned upon a line shaft without the removal of the line shaft from placement within its respective bearings.

While I have here shown my device as being accompanied by a pulley as the driving element, I do not wish to be limited in the application of the device to a split pulley as it is evident that a sprocket, or a grooved pulley or shrouded pulley or other driving wheel may be used with equal facility.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What I claim is:

1. In a device of the class described, in combination with a shaft, a husk disposed about the shaft, a split ring having an annular groove disposed upon its inner surface adapted for fitting the inner surface of the husk, a pair of split eccentrics rotatable relative to each other and fitted to the inner surface of the split ring, holes having tapered side walls disposed in the adjacent ends of the split eccentric members, tapered bolts disposed within the holes and adapted for expanding the eccentric members within the split ring and the split ring into expanded locked position within the husk, a pulley hub rotatably mounted within the inner one of the split eccentrics, a split sphere splined upon the shaft, grooves disposed in the outer surface of the split sphere, a pulley secured to the hub and journaled to the split sphere, and pins having rollers secured to their one end mounted within the pulley and arranged to effect driving relation between the pulley and the split sphere.

2. In a device of the class described, in combination with a shaft, a husk disposed upon the shaft and spaced therefrom, a grooved expansible split ring adjustably disposed within the husk, a pair of expansible split eccentrics rotatably mounted within the split ring, means for securing the eccentrics together and for expanding the same, a pulley having a projecting hub, the hub being journaled within the inner one of the eccentrics, a split sphere splined upon the shaft and coacting with the pulley and coacting with grooves disposed in the outer periphery of the split sphere.

3. In a device of the class described, in combination with a shaft, a split member secured to the shaft, a pulley adjustably secured to the split member, means effecting a driving relation between the split member and the pulley, a driving hub outwardly extending from the pulley, a pair of adjustable eccentrics disposed upon the hub, a split ring disposed about the eccentrics, a husk bearing for the split ring and means for locking the eccentrics relative to each other and to the husk.

4. In a device of the class described, in combination with a shaft, comprising a sphere fixed upon the shaft, a pulley adjustably secured to the sphere and a driving connection disposed therebetween, a hub formed integral with the pulley, eccentrics rotatably disposed upon the hub, a split ring encompassing the eccentrics, a husk disposed about the split ring and adapted for journaling the outer surface of the split ring therein, and means for locking the eccentrics and the split ring in adjusted placement within the husk.

ARCHIE NAULT.